No. 663,034. Patented Dec. 4, 1900.
H. B. LYNCH.
APPARATUS FOR DIPPING PIPES OR BARS.
(Application filed Oct. 28, 1899.)
(No Model.)
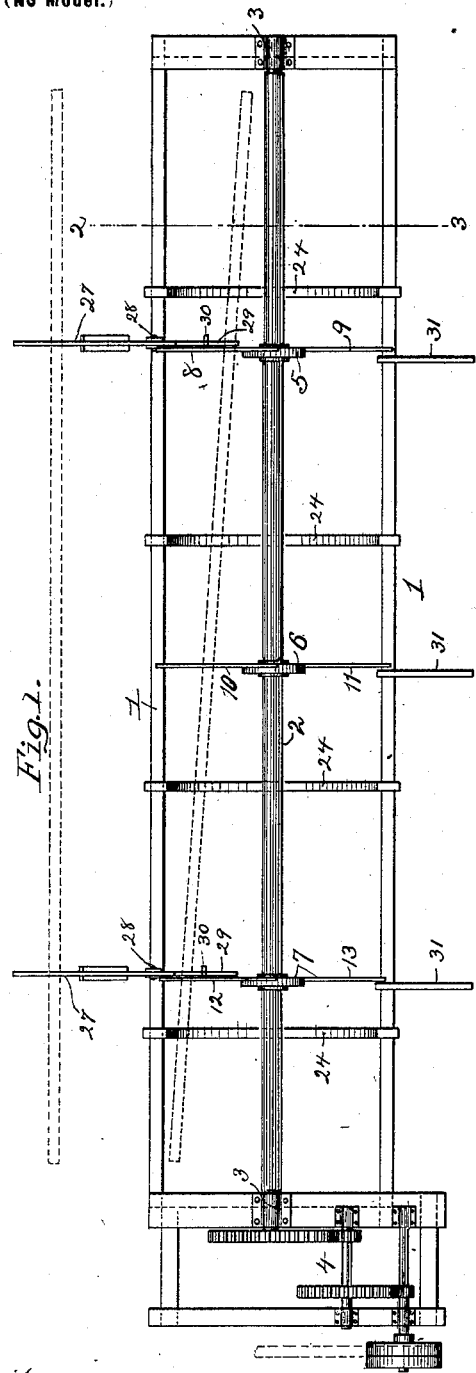
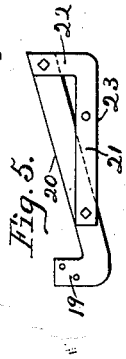
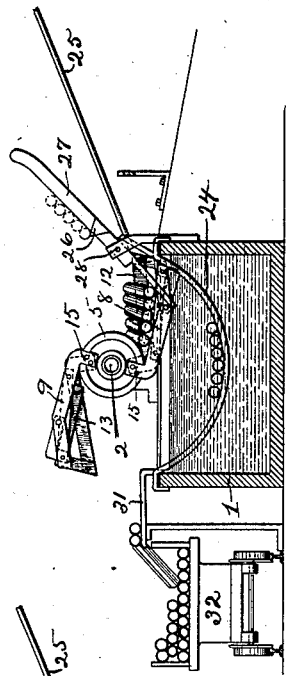
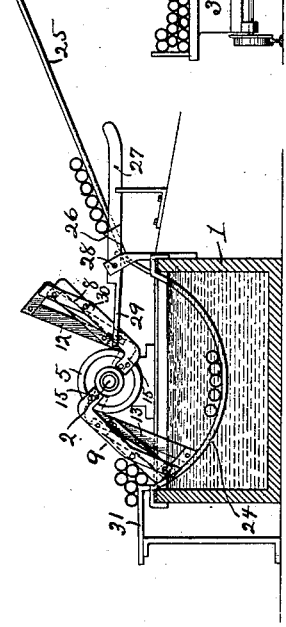
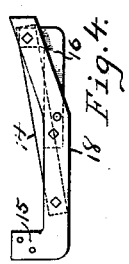
Witnesses:
Inventor:
Harry B Lynch
By Kay & Totten
Attorneys.

UNITED STATES PATENT OFFICE.

HARRY B. LYNCH, OF VERSAILLES, PENNSYLVANIA, ASSIGNOR TO THE NATIONAL TUBE COMPANY, OF NEW YORK, N. Y., AND PITTSBURG, PENNSYLVANIA.

APPARATUS FOR DIPPING PIPES OR BARS.

SPECIFICATION forming part of Letters Patent No. 663,034, dated December 4, 1900.

Application filed October 28, 1899. Serial No. 735,062. (No model.)

*To all whom it may concern:*

Be it known that I, HARRY B. LYNCH, a resident of Versailles, in the county of Allegheny and State of Pennsylvania, have invented a new and useful Improvement in Apparatus for Dipping Pipes or Bars; and I do hereby declare the following to be a full, clear, and exact description thereof.

My invention relates to apparatus for dipping pipes and bars, its object being to provide a simple automatic dipping apparatus especially applicable to the cooling of galvanized or metal-coated pipes or bars in bulk.

In the manufacture of galvanized pipes, to which this invention is particularly applicable, the pipes, if of small size, are drawn, one or more at a time, from the galvanizing-bath, and it has been customary to dip such pipes by hand into a cooling-tank. The present invention is adapted to receive such pipes from an inclined way, to dip the same, and to deliver them from the tank, all hand-labor being done away with.

The invention comprises, generally stated, a tank and a rotating shaft extending longitudinally above the same and carrying arms adapted to sweep through the tank, the arms receiving the pipe and lowering it into the tank, while the opposite sides of the next arms lift such pipe from the tank and deliver it therefrom.

It also consists in certain other improvements, which will be hereinafter more particularly set forth and claimed.

To enable others skilled in the art to practice my invention, I will describe the same more fully, referring to the accompanying drawings, in which—

Figure 1 is a top or plan view of the apparatus. Figs. 2 and 3 are cross-sections on the line 2 3, Fig. 1, showing the swinging arms in different positions; and Figs. 4 and 5 are detail views of the swinging arms.

The tank 1 employed is of suitable length, according to the length of pipes or bars to be dipped, and it is intended to contain water, as shown, though for certain other purposes the tank may contain any other liquid, as desired. I will describe the invention particularly in connection with the dipping of pipes into water for cooling the same. Above the tank 1 is the rotary shaft 2, mounted in bearings 3 3 at each end of the tank and shown as driven by suitable gearing 4, the drawings illustrating the power applied through a belt, though the power may be applied in any suitable way. The shaft 2 carries two or more disks, according to the length of the shaft, the drawings showing three such disks at 5 6 7, the central disk 6, with its arms, being employed to prevent sagging of the pipes. Secured to these disks are suitable arms, the disk 5 carrying the arms 8 9, the disk 6 carrying the arms 10 11, and the disk 7 carrying the arms 12 13. The machine may be operated with but one arm connected to each disk. While the arms carried by the three disks are somewhat different, the two arms carried by any one of the disks are alike. The arms 10 and 11, carried by the middle disk 6, when such disk is employed, are simply supporting-arms extending out in line with the supporting-faces of the arms of the other disks and do not need description. For the sake of clearness in illustration these arms are only shown in Fig. 1, being omitted from Figs. 2 and 3 to make the construction of the other arms clear. The arms 8 and 9 each comprise a main body portion 17, provided at one end with a lug 15, by means of which the arm is attached to the disk 5, the other end of said arm being inclined upwardly and secured to the outer end of the angle-bracket 16, the inner end of which is secured to the body portion 17 near its middle, forming with the latter substantially a straight lower or pushing face 18. The bar 14 connects the outer end of the body portion with the inner end thereof and forms a straight upper or supporting face for the pipes, said supporting-face being inclined with reference to the pushing-face 18. Each of the arms 12 and 13 has the securing-lug 19 for attaching it to the disk 7, from which lug the arm extends at an angle, forming the straight inclined upper or supporting face 20. The outer end of the arm is secured to the vertical member 22 of the angle-bracket 21, the horizontal member of which is secured to the inner end of the arm and forms the straight lower or pushing face 23. It will be noticed that the arms 8, 9, 12, and 13 stand at an angle at the radius *x x*, passing through the shaft at the point of attachment of said arms thereto, the arms sloping rearwardly (having reference to the direction of movement of the arms) away from such radius and the upper or supporting face of each arm extending out in a substantially tangential line or incline from the lug, by means of which the arm is attached to the disk 5 or 7. The front or pushing-face of each arm also slopes rearwardly from the radius *x x*, but in a lesser degree than the rear or supporting face, said faces as a consequence being closest together at their inner ends and gradually diverging toward their outer ends. By having the arms bent rearwardly from the radius passing through their points of attachment to the shaft 2 and by having the upper and lower faces of said arms diverge outwardly a construction of arm is provided which is peculiarly adapted for the purpose of dipping pipes and bars, for the reason that when the arms are in position to receive the pipes, as shown in Fig. 2, the upper or supporting faces of said arms are on an incline, so that the pipes readily roll onto said arms, and as said arms pass downwardly into the tank the pipes are supported thereon and gradually and easily roll off therefrom. The front or pushing faces are nearer the radius *x x* than are the rear or supporting faces and for this reason are effective for pushing or sweeping the pipes up and out of the tank. The arms 12 13 are so placed on their disk that the inclined supporting-faces 20 thereof are slightly in the rear (considering the direction of movement of the arms) of the inclined supporting-faces 14 of the arms 8 and 9, so that when the arms are in position to receive the pipes the supporting-faces of the arms 12 and 13 will be raised above the supporting-faces 14 on the arms 8 and 9. This is fairly shown in the sections Figs. 2 and 3, and its purpose is to provide for the lowering of one end of the pipe, such as that resting on the arm 8 or 9, into the water before the other end of the pipe, such as that resting on the arm 12 or 13, so providing for the passage of the cooling liquid up into the pipe, so as to drive any steam generated in the dipping thereof out at the opposite end and provide for the passage of the water entirely through the pipe. The positions of the pipes when supported upon these arms and as they are lowered into the tank are fairly shown in Fig. 2. The rear or pushing face 23 of the arms 12 13, like the rear face 18 of the arms 7 and 8, are preferably straight, though the rear faces of the arms 8 9 are set a little forward of the like faces of the arms 12 13, as fairly shown in Figs. 2 and 3, so as to hold the pipes on a slight incline as they are forced or swept by these faces out of the tank. In order to support the pipes in the tank in the course of these arms, I employ the curved skeleton supports 24, resting on the edges of the tank and holding the pipes above the bottom thereof, it being preferred that the supports shall be formed in a circle about corresponding to the outer faces of the sweeping arms.

In order to enter the pipes into the tank, the workmen drop the same onto the inclined way 25, and they slide down into contact with lugs 26 on the tipping arms 27, these arms being pivoted, as at 28, to the tank and having the extensions 29 projecting out over the tank at one side of and close to the course of the swinging arms 8 9 or 12 13. These arms carry lugs or pins 30, adapted to strike on the extensions 29 of the tipping arms and draw them down. As the swinging arms—for instance the arms 8 and 12—descend they raise the outer ends of the tipping arms 27, and thereby lift the pipes from the inclined way 25, causing them to roll down onto the upper faces of the swinging arms 8 and 12, which support the same, as shown in Fig. 2. As the pipes drop onto the inclined way 25 the coating metal thereon is still practically molten, and to prevent injury thereto it is important that they should be kept rolling to maintain a coating of even thickness and prevent the metal from running down to one side of the pipes and that they should be handled gently, and this is accomplished in the gradual raising of the tipping arms by the swinging arms and the rolling and gradual lowering of the pipe onto the swinging arms. As the swinging arms enter the water the pipes are still kept rolling or turning thereon until the arms swing away from the pipes and leave them resting on the skeleton supports 24. As the shaft 2 turns, lowering the arms 8 and 12, the pipes are supported on such arms on an incline, the ends resting on the arms 8 being lower than those resting on the arms 12, and the pipes are lowered in this way into the water, so that the water can flow up through the pipes, giving escape for steam from the inside thereof, insuring the sinking of the pipes within the tank, and allowing for proper contraction of the metal in cooling, and the pipes are so cooled that the contracting of the coating metal will progress from one end thereof. As the main shaft continues to turn the pipes will be lowered into the tank and be deposited upon the skeleton supports 24, as shown in Figs. 2 and 3, and the arms 8 and 12 will then continue in their sweeping course, rising out of the tank, while the arms 9 and 13 will be brought around, so as to receive from the inclined way 25 another charge of pipes, which will be lowered into the tank in the way just described. As said arms 9 and 13 continue in their sweeping course their under or pushing faces 18 and 23 contact with the pipes previously dipped and resting on the supports 24 and sweep or push them out of the tank, as shown in Fig. 3, the pipes being raised gradually and rolled over themselves, and one end of the pipes being held higher than the other, so that the water can escape therefrom, and as the arms continue in their sweeping course the pipes are rolled onto the platform 31, from which they will naturally roll to the place of delivery, such as onto the car 32. In this way, through the regular sweep of the arms, the pipes are automatically received from the inclined platform and gradually lowered into the liquid, so as to insure the proper contact of the liquid with the interior thereof, and finally lifted out of the tank, manual labor other than to deliver the pipes onto the inclined way being entirely dispensed with. At the same time provision is made for the continual rolling or turning of the pipes to preserve a coating of even thickness and the gradual lowering of the pipes in proper position for properly cooling or coating, and any jarring of the pipes, which might affect the coating, is avoided, because the pipes can pass without any long descent onto the sweeping arms, which carry them in gradual course through the tank and deliver them therefrom.

While I have described the invention as applied particularly to the cooling of pipes, it is evident that it has advantages and may be employed for the cooling or coating either of pipes or bars, either singly or in bulk, and it is intended, of course, to include such uses within the invention.

What I claim as my invention, and desire to secure by Letters Patent, is—

1. In apparatus for dipping pipes and bars, the combination with a tank, of a rotary shaft above the same, arms carried thereby and adapted to sweep through the tank, said arms having supporting-faces inclined rearwardly from the radius passing through their points of attachment to the shaft.

2. In apparatus for dipping pipes and bars, the combination with a tank, of a rotary shaft above the same, arms secured to said shaft and inclined rearwardly from the radius passing through their points of attachment to the shaft to form supporting-faces to receive the pipes and lower them gradually into the tank.

3. In apparatus for dipping pipes and bars, the combination with a tank having skeleton supports therein, of a rotary shaft above the same, arms secured to said shaft and inclined rearwardly from the radius passing through their points of attachment to the shaft to form supporting-faces to receive the pipes and lower them gradually into the tank.

4. In apparatus for dipping pipes and bars, the combination with a tank, of a rotary shaft above the same, arms secured to said shaft and inclined rearwardly from the radius passing through their points of attachment to the shaft to form supporting-faces to receive the pipes and lower them gradually into the tank, the opposite faces of the arms being inclined at a lesser angle to the radius than the supporting-faces to sweep the pipes previously dipped out of the tank.

5. In apparatus for dipping pipes and bars, the combination of a tank, a rotating shaft above the same carrying arms adapted to sweep through the tank, the front or lower faces of such arms being straight and adapted to contact with the pipes in the tank and push the same therefrom, and the upper faces of said arms being inclined with reference to the lower faces.

6. In apparatus for dipping pipes and bars, the combination of a tank having skeleton supports therein, and a rotating shaft above the tank carrying arms adapted to sweep through the tank, the front or lower faces of such arms being straight and adapted to contact with the pipes in the tank and push the same therefrom, and the upper faces of said arms being inclined with reference to the lower faces.

7. In apparatus for dipping pipes and bars, the combination with a tank, of a rotary shaft above the same carrying an arm at each end adapted to sweep through the tank, the arm at one end of the shaft being in a different plane from that of the arm at the other end of the shaft to provide for entering one end of the pipes into the tank in advance of the other end.

8. In apparatus for dipping pipes and bars, the combination with a tank, of a rotary shaft above the same carrying an arm at each end adapted to sweep through the tank, the arm at one end of the shaft having an inclined supporting-face, and the arm at the other end of the shaft having an inclined supporting-face lying in a different plane from that of the supporting-face of the first-named arm.

9. In apparatus for dipping pipes and bars, the combination with a tank, of a rotary shaft above the same carrying sweeping-arms, and arms pivotally mounted at the side of the tank to normally lie in substantially a horizontal position and movable to deliver the pipes onto the sweeping-arms.

10. In apparatus for dipping pipes and bars, the combination with a tank, of an inclined way leading to the same, arms pivotally mounted at the side of the tank to lie in substantially a horizontal position, and a shaft mounted above the tank and carrying sweeping-arms adapted to engage with the pivoted arms and cause the delivery of the pipes from the inclined way onto the sweeping-arms.

11. In apparatus for dipping pipes and bars, the combination with a tank, of an inclined way leading to the same, arms pivotally mounted at the side of the tank to lie in substantially a horizontal position, a shaft mounted above the tank and carrying sweeping-arms, pins on said arms adapted to engage with the pivoted arms to cause the delivery of the pipes from the inclined way onto the sweeping-arms.

In testimony whereof I, the said HARRY B. LYNCH, have hereunto set my hand.

HARRY B. LYNCH.

Witnesses:
GRACE C. RAYMOND,
ROBERT C. TOTTEN.